UNITED STATES PATENT OFFICE.

CARL REIMER, OF HALLE, GERMANY.

PROCESS OF HARDENING OBJECTS MADE OF CRUDE GYPSUM.

SPECIFICATION forming part of Letters Patent No. 479,019, dated July 19, 1892.

Application filed August 26, 1891. Serial No. 403,752. (No specimens.)

*To all whom it may concern:*

Be it known that I, CARL REIMER, a subject of the King of Prussia, German Emperor, and a resident of the city of Halle, in the German Empire, have invented a certain new and useful Process of Hardening Objects Made of Crude Gypsum and Rendering Them Capable of Resisting the Action of the Atmosphere; and I do hereby declare that the following is a full, clear, and exact description of the invention, which will enable others skilled in the art to which it appertains to make and use the same.

This invention relates to a process for hardening objects made of crude gypsum and rendering them capable of resisting the action of the atmosphere. In conjunction with the hardening process color may be employed for coloring the gypsum objects.

The invention consists in placing the objects made of crude gypsum, after drying them, in a solution of hydrate of barium for the purpose of hardening them and in the treatment of the objects so hardened with a solution of oxalic acid to render them capable of resisting the action of the atmosphere. To color the objects so produced, they are impregnated with color solutions previous to the treatment with baryta-water, or the color is added to the baryta or oxalic-acid solution.

The process is performed in the following manner: The crude gypsum blocks are first cut or mechanically worked to the desired form and then exposed to a temperature of from 100° to 150° Celsius for the purpose of expelling the moisture therefrom. They are then placed in a warm solution of hydrate of barium, in which they are allowed to remain a longer or shorter time, according to their dimensions, a gradual hardening of the gypsum thereupon taking place. When this is completed, the objects are smoothed by grinding or other means and then placed in a ten per cent. (or thereabout) watery oxalic-acid solution, from which after some hours they are withdrawn and dried and polished. They are then of a hardness exceeding that of marble and resist the action of water; neither is the polish affected by treatment with water, while objects of gypsum hardened by the usual process lose their polish when placed for a few minutes in water.

In this process the chemical action is as follows: By the impregnation with baryta solution the gypsum is reduced partly to sulphate of barium and caustic lime. The former is known to be insoluble in water. By the then following treatment with oxalic-acid solution the caustic lime is converted into oxalate of lime, which also is insoluble.

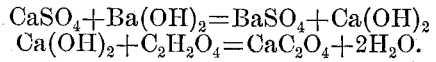

The objects produced in the described manner have the natural color of the gypsum of which they are formed; but color may be imparted in conjunction with the hardening operation by placing the dried gypsum previous to the treatment with baryta solution in a solution of a colored metallic sulphate—for example, iron sulphate, copper sulphate, chrome sulphate—in a solution of any suitable dye, or such coloring-matters may be added to the baryta-water or to the oxalic-acid solution as are soluble therein.

For the hardening of objects cut out of gypsum various methods have already been proposed. They all have the same basis—namely, that the gypsum is first dried and then placed in certain salt solutions—for example, a solution of alum, copperas, &c. The objects so prepared possess considerable hardness, but they do not resist the action of water much more than the crude gypsum itself. On the other hand, by the process of this invention not only is the gypsum hardened, but its surface is converted into an insoluble material, so that it will serve as a substitute for marble.

What I claim as my invention, and desire to secure by Letters Patent, is—

The process of hardening and rendering water-proof objects cut from crude gypsum, consisting in drying the objects by the application of heat and steeping the dried objects first in a solution of hydrate of barium and afterward in a solution of oxalic acid, substantially as described.

In testimony whereof I have signed this specification in the presence of two subscribing witnesses.

CARL REIMER.

Witnesses:
 Y. FERREN,
 T. HAUPT.